US010565274B2

(12) United States Patent
Gupta (10) Patent No.: US 10,565,274 B2
(45) Date of Patent: Feb. 18, 2020

(54) MULTI-APPLICATION USER INTEREST MEMORY MANAGEMENT (71) Applicant: MICROSOFT TECHNOLOGY LICENSING, LLC, Redmond, WA (US)

(72) Inventor: Rahul Gupta, Telangana (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 254 days.

(21) Appl. No.: 15/651,905

(22) Filed: Jul. 17, 2017

(65) Prior Publication Data
US 2019/0005137 A1   Jan. 3, 2019

(30) Foreign Application Priority Data
Jun. 30, 2017  (IN) .............................. 201741023176

(51) Int. Cl.
G06F 7/02       (2006.01)
G06F 16/00      (2019.01)
G06F 16/9535    (2019.01)
G06F 16/335     (2019.01)
G06F 16/2457    (2019.01)
G06F 16/248     (2019.01)

(52) U.S. Cl.
CPC ........ G06F 16/9535 (2019.01); G06F 16/248 (2019.01); G06F 16/24575 (2019.01); G06F 16/337 (2019.01)

(58) Field of Classification Search
CPC .......... G06N 20/00; G06N 3/08; G06N 7/005; G06F 16/337; G06F 16/24575; G06F 16/9535; G06F 9/541; G06F 16/248; G06Q 10/10; G06Q 30/0201
See application file for complete search history.

(56) References Cited

U.S. PATENT DOCUMENTS

| 8,683,334 B2 | 3/2014 | Potte et al. |
| 8,839,384 B2 | 9/2014 | Roy et al. |
| 9,032,011 B2 | 5/2015 | Walsky et al. |
| 9,173,055 B2 | 10/2015 | Ngo et al. |
| 9,430,211 B2 | 8/2016 | McErlane et al. |
| 2002/0073241 A1 | 6/2002 | Gilbert et al. |

(Continued)

OTHER PUBLICATIONS

Riva, Oriana, "Contory: A Middleware for the Provisioning of Context Information on Smart Phones", In Proceedings of the ACM/IFIP/USENIX International Conference on Middleware, Nov. 1, 2006, 219-239 pages.

(Continued)

Primary Examiner — Bruce M Moser
(74) Attorney, Agent, or Firm — Shook, Hardy & Bacon LLP (57) ABSTRACT The technology described herein allows applications to access user-interest information generated by a plurality of applications. User-interest data can be generated by applications when a user interacts with an application. The technology described herein allows an application to submit user interests to a system that makes the user interests available to other applications. The technology allows each application to subscribe to user interests that are consumable by the application. In this way, each application can control what user-interest information is received.

20 Claims, 6 Drawing Sheets (56) References Cited

U.S. PATENT DOCUMENTS

| | | | |
|---|---|---|---|
| 2003/0140058 A1 | 7/2003 | Martin et al. | |
| 2009/0235185 A1 | 9/2009 | Gill | |
| 2014/0173625 A1* | 6/2014 | Kumar | G06F 9/4843 |
| | | | 718/106 |
| 2016/0224637 A1 | 8/2016 | Sukumar et al. | |
| 2016/0360382 A1* | 12/2016 | Gross | G06F 3/0488 |
| 2017/0104799 A1* | 4/2017 | Prock | H04W 12/06 |
| 2018/0020087 A1* | 1/2018 | Shi | H04W 4/21 |
| 2018/0300680 A1* | 10/2018 | Undernehr | G06F 8/65 |
| 2018/0324265 A1* | 11/2018 | Macskassy | H04L 67/20 |

OTHER PUBLICATIONS

"17 Using the Publish-Subscribe Model for Applications", Retrieved From: http://web.archive.org/web/20120121043107/https://docs.oracle.com/cd/810501_01/appdev.920/a96590/adg15pub.htm, Jan. 21, 2012, 7 Pages.

"International Search Report and Written Opinion Issued in PCT Application No. PCT/US2018/039642", dated Sep. 5, 2015, 7 Pages.

\* cited by examiner

MULTI-APPLICATION USER INTEREST MEMORY MANAGEMENT

CROSS REFERENCE TO RELATED APPLICATIONS

This application claims priority to Indian Patent Application having Application No. 201741023176, filed in India on Jun. 30, 2017, entitled "MULTI-APPLICATION USER INTEREST MEMORY MANAGEMENT," the entirety of which is hereby incorporated by reference.

BACKGROUND

In the recent past, there has been an exponential growth in the number of online service providers. With the advent of smartphones, similar growth has been witnessed in the number of apps and app providers. For each task (e.g., playing music), there are multiple apps and/or services that can be used, resulting in users having multiple apps on their devices for each task. Applications are often unable to share user-interest information with each other, in part, because of incompatible data schemas. Presently, user interests are collected and stored on an application-by-application basis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein allows applications to access user-interest information generated by a plurality of applications. User-interest data can be generated by applications when a user interacts with an application. The interactions can include explicitly stating interests, such as providing music preferences, movie preferences, or other likes or dislikes. The interactions can include user queries from which a user interest can be inferred. The interactions can also include various events, such as making a purchase, visiting a store, traveling on vacation, and such.

The technology described herein allows an application to submit user interests to a system that makes the user interests available to other applications. The technology allows each application to subscribe to user interests that are consumable by the application. In this way, each application can control what user-interest information is received. The technology allows new applications without user-interest data to provide a customized user experience using user-interest data from other applications.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein allows applications to access user-interest information generated by a plurality of applications. User-interest data can be generated by applications when a user interacts with an application. The interactions can include explicitly stating interests, such as providing music preferences, movie preferences, or other likes or dislikes. The interactions can include user queries from which a user interest can be inferred. The interactions can also include various events, such as making a purchase, visiting a store, traveling on vacation, and such.

The technology described herein allows an application to submit user interests to a system that makes the user interests available to other applications. The technology allows each application to subscribe to user interests that are consumable by the application. For example, a music streaming application could subscribe to music interests. The interests can be broken down by action. As mentioned, user interests can be inferred from user actions. Using the music example, an application could subscribe to music listening and music purchase actions. Subscribing to these actions causes the application to receive user-interest information related to music listening and purchases. Other user actions, such as playlist generation, would not be forwarded without a subscription.

The user-interest data can specify various entities related to a user interest. Continuing with the music example, a listening event occurred when the user listened to Alan Jackson's song "Remember When." This event includes the artist "Alan Jackson" and the song title "Remember When." Different applications may identify these entities in unique ways, such as with unique identification numbers. The technology can access a knowledge base that includes the entity in a universal form that is mapped to the event information and is also linked to an entity ID for each application that subscribes to the system. In this way, each application can receive user-interest information with compatible entity IDs.

A user's interest can be determined by analyzing contextual signal data, including event data for a user. The signal information is analyzed to detect patterns that correspond to a user interest. For example, a user that frequently visits fish restaurants may be categorized as having an interest in fish restaurants. Visiting a restaurant can be an event that is communicated to an application. A person may be associated with multiple interests and interest events.

"Contextual signals," as utilized herein, may reflect any attribute of a user (for instance, physical characteristics), the user's historical interaction with the system (e.g., behavior, habits, and system interaction patterns), and/or the user's recent interaction with the system (with "recency" being defined in accordance with a predetermined time frame relative to a given point in time) that may affect the likelihood or probability that the user desires to engage in a particular activity. Such contextual signals may include, by way of example only and not limitation, the location of the user of the computing device (determined utilizing, for instance, Global Positioning System (GPS) signals, Internet Protocol (IP) address, or the like), the time of day (either general (for instance, morning or afternoon) or exact (for instance, 6:00 pm)), the date (either exact or generally a particular month, season, etc.), a physical characteristic of the user (for instance, if the user is paralyzed and capable of only voice input, or the like), a task currently engaged in on the computing device by the user, a task recently engaged in on the computing device by the user (again with "recency" being defined in accordance with a predetermined time frame relative to a given point in time), an object the user is currently engaged with on the computing device (for instance, an entity such as a contact, a file, an image, or the like), an object the user was recently engaged with on the computing device, a function currently being performed by the user on the computing device, a function recently performed by the user on the computing device, hardware currently being utilized on the computing device, hardware recently utilized on the computing device, software currently being utilized on the computing device, and software recently utilized on the computing device.

The technology can communicate interest information to applications by event. Each event related to an interest can be classified into an interest type. The event record can include entities and actions taken. The technology can analyze signal data to build event records related to different interests. The event records can then be communicated to applications that subscribe to an interest associated with the events.

The events can be detected from a variety of signals received from computing devices, such as wearables, personal computers, smartphones, tablets, e-readers, augmented reality glasses, virtual reality glasses, and such. The relevant signals collected by these devices can include user browsing history, query data, purchase data, music interactions, GPS and other location data, travel times, application usage, phone records, messaging records, and similar. The various contextual signals can be combined to determine event data. Event data can include exercise events, eating events, work events, transit events, social events, entertainment events, browsing events, search events, shopping events, and other events related to point of interest usage.

In one aspect, eating events are used to determine interest in different types of food and restaurants. Reservation applications and diet/exercise applications may have particular interest in eating-related user-interest information. Exposing the eating-related interest data to various applications can help the applications better serve the user. Eating events can be detected using calendar data, location data, diary entries, calorie applications, and other signal sources. For example, a user's location at a restaurant could indicate an eating event. In another aspect, a user's purchases at a grocery store could be used to determine, over the course of a week, for example, the type of food that the user is eating. Some users explicitly track calories using a diet program, diary, calorie-counting application, or other application. Signals from these applications can be used to determine that an eating event occurred as well as the contents of the eating event. As mentioned, the duration of the eating event, the amount of food consumed, and the style or category of the food consumed can be determined. For example, the user's eating events may indicate an interest in Mexican food. The eating events can be analyzed to determine a user's food interests. The user could be classified as having an interest in barbeque, Indian food, and steakhouses, for example. These interests can be used to select point of interest data for the user.

In one aspect, a work event can be interest data. Productivity applications, such a personal assistants, may use work-related user-interest events to generate personalized experiences for the user. A user work event can be detected through a variety of signals, including GPS data indicating a user's location is at a place of work, computer usage data indicating that the user is performing work through their computing device, communication records indicating that the user is communicating with known work associates, and such. A user's work events can be used to infer interest in locations nearby a workplace.

In one aspect, transit or commute events can be a constituent of user-interest data. Navigation applications and geographic search applications can have an interest in understanding the geographic areas that are of interest to the user. The transit event can be detected using user data, such as GPS data, that could indicate a length and velocity of movement. The transit event can be classified as a home-to-work commute or otherwise delineated by a start location and an end location. The time of day and duration of the transit event can also be recorded. In addition, the means of transportation (e.g., car, bus, train, bike, etc.) could be determined by analyzing a movement pattern.

In one aspect, a social event can be a constituent of user-interest data. A social event can comprise a gathering of friends and family for social interaction. A social event can be detected using calendar information indicating a social event, and GPS or other location data indicating a location consistent with a social event, such as a friend's house. A social event can also be detected by mining social network data for pictures, images, and posts, such as check-ins, communicating information about a particular social event, such as a birthday party, wedding, cookout, and such. The social event can be used to determine social connections and interests. For example, a user may have an interest in social events at different times of day. This pattern could be used by applications to plan or suggest social events at times when the user typically is interested in socializing.

In one aspect, a shopping event can be a constituent of point of interest usage data. The shopping event can be determined through location data, credit card information, browsing history, query history, etc. The shopping event can indicate that an item was purchased and a classification for the item. For example, an item could be classified as apparel, food, household item, etc. The user's purchase history can be used to determine interests.

Each identified event can be associated with contextual information directly related to the event in the form of associated entities and actions, as well as peripheral contextual information describing other activities in a user's day that are not directly related to the event. The direct contextual information associated with an event can comprise a location (entity) where the event occurred, purchases made (the purchase is an action and the item purchased is an entity), the presence of other people during the event (entity), and such. The direct contextual information can be learned through analysis of user data captured during the event. The peripheral contextual information can include a description of a user's activities during the day, days, and hours before or after an event.

Aspects of the technology described herein can also use semantic data describing the user to determine user interests and related points of interest. Semantic information can include a user's social contacts, work contacts, interests, home location, work address, calendar data, tasks, and other information. The semantic data can be used to identify or define a user interest.

As mentioned, the various user-interest events can be stored for communication to subscribing applications.

Having briefly described an overview of aspects of the technology described herein, an exemplary operating environment in which aspects of the technology described herein may be implemented is described below in order to provide a general context for various aspects.

Figure 1:
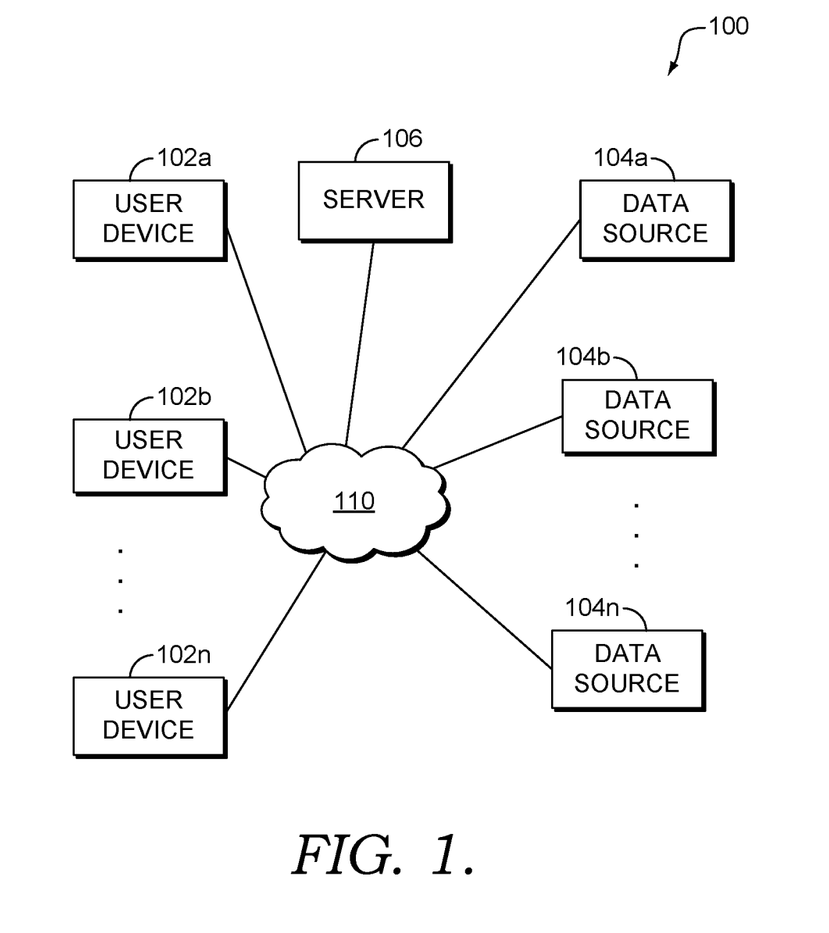
FIG. 1 is a block diagram of an example operating environment suitable for implementations of the present disclosure.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can run many different applications. The devices can belong to many different users and a single user may use multiple devices. The user activities performed by the applications can be analyzed to determine a user's interests, including geographic areas of interest, entertainment interest, reading interest, shopping interest, travel interest, and such. User events can be assigned an interest. The event, such as a query submission or shopping purchase, can be associated with an action and an entity. For example, an interest in country music could be demonstrated by purchasing (action) an album (entity) by an artist (entity).

Server 106 can comprise server-side software designed to work in conjunction with client-side software on user devices 102a and 102b through 102n so as to implement any combination of the features and functionalities discussed in the present disclosure. For example, the server 106 may run data sharing engine 260, which helps applications share intent data. The server 106 may receive activity records, such as search results and purchase history, from a large number of user devices belonging to many users. The data can be stored in a data store and associated with a user, as part of a user record. This data can be described as crowd-sourced data. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2. The data sources 104a through 104n can comprise a knowledge graph that stores information about entities and relationships between entity IDs and applications. The data sources can also store application subscription information.

Figure 2:
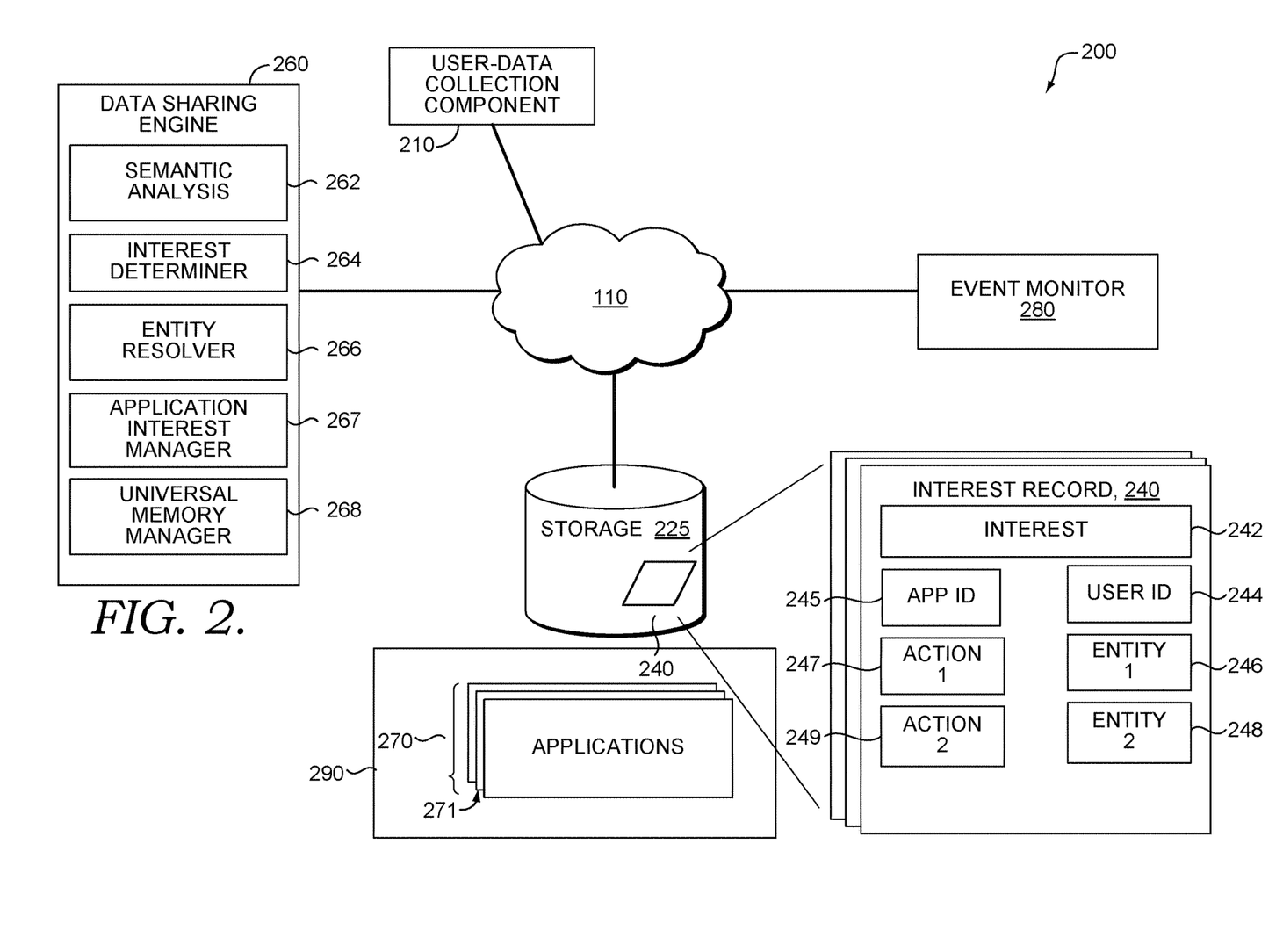
FIG. 2 is a diagram depicting an example computing architecture suitable for implementing aspects of the present disclosure.

Operating environment 100 can be utilized to implement one or more of the components of system 200, described in FIG. 2, including components for collecting user data, identifying user interests, receiving user queries related to a task, responding to the query with efficient follow-up questions, identifying the task, and helping the user complete the task.

Referring now to FIG. 2, with FIG. 1, a block diagram is provided showing aspects of an example computing system architecture suitable for implementing an aspect and designated generally as system 200. System 200 represents only one example of a suitable computing system architecture.

Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively connects components of system 200 including user-data collection component 210, data sharing engine 260 (including its components 262, 264, 266, 267, and 268), event monitor 280, client device 290, and data store 225. These components may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some aspects, user-data collection component 210 may be employed to facilitate the accumulation of user data of a particular user (or in some cases, a plurality of users including crowdsourced data) for user event monitor 280, data sharing engine 260, or an application 270. The data may be received (or accessed), and optionally accumulated, reformatted, and/or combined, by user-data collection component 210 and stored in one or more data stores, where it may be available to other components of system 200. For example, the user data may be stored in or associated with a user profile as an interest record. As explained, each interest record can identify an interest, one or more entities, and one or more actions taken in relation to the interest. In some aspects, any personally identifying data (i.e., user data that specifically identifies particular users) is either not uploaded or otherwise provided from the one or more data sources with user data, is not permanently stored, and/or is not made available to user event monitor 280 and/or data sharing engine 260.

User data may be received from a variety of sources where the data may be available in a variety of formats. For example, in some aspects, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user-data associated with communication events; etc.) including, in some aspects, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle user data, traffic data, weather data (including forecasts), wearable device data (which may include physiological data about the user such as heart rate, pulse oximeter or blood oxygen level, blood pressure, galvanic skin response, or other physiological data capable of being sensed or detected), other user device data (which may include device settings, profiles, network-related information (e.g., network name or ID, domain information, work group information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 210 receives or accesses data continuously, periodically, or as needed.

User event monitor 280 is generally responsible for monitoring user data for information that may be used for identifying and defining user-interest events, which may include identifying and/or tracking features (sometimes referred to herein as "variables") or other information regarding specific user interactions with entities. A user-interest event can be used as input to calculate an interest in an entity category, such as Chinese restaurants. The "event" is a way to format relevant information for consumption by an interest classifier or application. In other words, the event record can follow a data schema that allows the interest classifier to determine interests from the event records. The event's occurrence and details can be inferred from the user data in some cases. For example, a location can be designated as the user's place of work because the user regularly spends time at the location during work hours. Using events, instead of actual data as input, can simplify the process of calculating an interest by providing a more uniform input across users.

Aspects of user event monitor 280 may determine, from the monitored user data, when the user participates in an exercise event, sleep event, eating event, work event, social event, entertainment consumption event, or other event associated with a user interest. In other words, the user event monitor 280 may receive user data and generate event data, such as a work event or social event. The event data can then be used to calculate an interest of a user or memorialize an interest of a user for consumption by a subscribing application. The interest can be inferred from an event record. For example, an exercise event showing the user running can be used to determine an interest in fitness stores, such as gyms and sports stores, even though the event did not take place at the gym or sports store.

User event monitor 280 may identify current or near-real-time user event information and may also identify historical user event information, in some aspects, which may be determined based on gathering observations of user data over time or accessing user logs of past event data (such as a social event data store). The historical user event information can be used to detect patterns related to interests. A user that visits a Chinese restaurant once may or may not have an actual interest in Chinese food, but a user who visits Chinese restaurants regularly is likely to have an interest in Chinese food.

In some aspects, information determined by user event monitor 280 may be provided to data sharing engine 260 including information regarding the current context and historical events (historical observations). For example, the user event monitor 280 can provide event records for use by the data sharing engine 260.

In some aspects, the user interests may be interpreted by a machine classification process to determine that a user-interest event has occurred. For example, in some aspects, user event monitor 280 employs user event logic, which may include rules, conditions, and/or associations, to identify or classify user events by interest. The classifying of events (e.g., eating, sleep, work, social, exercise, transit) can be based on feature-matching or determining similarity in features, which falls under pattern recognition. This type of classification may use pattern recognition, fuzzy logic, neural network, finite state machine, support vector machine, logistic regression, clustering, or machine-learning techniques, similar statistical classification processes, or combinations of these to identify events from user data. For example, exercise logic may specify types of physiological information that are associated with an exercise event, such as a user's heart rate staying a threshold amount above a baseline for a designated duration, in combination with location or movement data. Different patterns of activity may be mapped to different events and interests. For example, running, cycling, swimming, golf, tennis, and soccer may all have different activity patterns.

In some aspects, a user may specify features used for detecting an event or even a specific type of event. For example, upon detecting a possible social event, a personal assistant application may ask the user to confirm that she just watched a movie with friends A, B, and C, and may ask the user what movie was watched. Based on this feedback, activity patterns can be learned for the user and used to identify future social events. Similarly, event patterns from other users can be used to recognize events for a particular user.

In aspects using contextual information related to user devices, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some aspects, a device name or identification (device ID) may be determined for each device associated with a user. This information about the identified user devices associated with a user may be stored in a user profile associated with the user, such as in user account(s). In an aspect, the user devices may be polled, interrogated, or otherwise analyzed to determine contextual information about the devices. This information may be used for determining a label or identification of the device (e.g., a device ID) so that contextual information about an exercise event captured on one device may be recognized and distinguished from data captured by another user device. In some aspects, users may declare or register a user device, such as by logging into an account via the device, installing an application on the device, connecting to an online service that interrogates the device, or otherwise providing information about the device to an application or service. In some aspects, devices that sign into an account associated with the user, such as a Microsoft® account or Net Passport, email account, social network, or the like, are identified and determined to be associated with the user.

Continuing with system 200 of FIG. 2, data sharing engine 260 is generally responsible for sharing user-interest information between applications 270. In some aspects, data sharing engine 260 may run on a server, as a distributed application across multiple devices, or in the cloud.

As shown in example system 200, data sharing engine 260 comprises semantic information analyzer 262, interest determiner 264, entity resolver 266, application interest manager 267, and universal memory manager 268. Semantic information analyzer 262 is generally responsible for determining semantic information associated with the event-related features identified by user event monitor 280. For example, while an event feature may indicate a specific type of exercise (e.g., tennis), the semantic analysis may determine the tennis club the user belongs to, playing partners at the club, upcoming tennis tournaments the user has registered for, or other entities associated with the interest event record. This allows for more relationships between entities and interests than are directly observable. Semantic information analyzer 262 may determine additional event or action-related features semantically related to the event that may be used for identifying user interest patterns and/or interest records. For example, GPS data can indicate that a user attended a concert venue. The semantic information analyzer 262 can retrieve information about a concert occurring at the time of the visit. A user-interest record can then include an action (concert attendance) with the artists performing (entities). In addition, the artist's genre could be retrieved from another source to form a robust user-interest record based on the concert. Without the semantic information analyzer 262, it might not have been possible to even discern an interest in music.

In some aspects, semantic information analyzer 262 may utilize a semantic knowledge representation, such as a relational knowledge graph, to connect interests with entities and actions. Semantic information analyzer 262 may also utilize semantic analysis logic, including rules, conditions, or associations, to determine semantic information related to the interest interaction patterns.

Interest determiner 264 receives user data and determines that the user has one or more interests that can be mapped to an interest in an interest knowledge base and completes a user-interest record. The interest determiner 264 can evaluate data and generate interest records periodically, such as hourly, daily, or weekly. The user interest can be determined heuristically or by using machine learning, such as a specially trained machine classifier. The heuristic approach can assign a value to a variable based on user activities and events derived from the user data. For example, visiting a Chinese restaurant twice within a month could cause the user to be classified as having an interest in Chinese food. A Chinese food interest event could then be created. Other event data can be mapped to other interests in a similar fashion. Each variable could be assigned a weight, and then the weight could be combined with the assigned value to determine an interest.

A classifier could be trained to receive user input and classify an event into an interest category. Generally, the classifier can be trained by inputting representative user data into the classifier and forcing the classifier to calculate a specific score corresponding to a classification. For example, a batch of user data could be input to the classifier and constrained with an interest in baseball. A second batch of user data could be input to the classifier and constrained to an interest in tennis. This process can be repeated until the nodes or features of the classifier are assigned values that result in a similar classification being calculated when similar data is input. Once trained, the classifier can receive user data and generate an interest classification. The interest classification can be associated with a confidence factor that is also derived from the input. The classifier can receive a large range of values associated with different variables. In some instances, no data will be available for various variables. The difference in the amount of data and type of data as well as the values associated with the data can cause a different confidence score. In some instances, the confidence score can determine how the application interest manager 267 uses data. For example, an application could subscribe to interest event records with above a threshold confidence score. Scores associated with a low confidence value could be excluded from use by some applications. Other applications may set a different confidence score threshold and receive the records.

The application interest manager 267 manages application subscription information. The application interest manager 267 can receive and store interest subscriptions from various applications. The subscription can be stored in a knowledge base that includes a plurality of interests, actions, and other features such as confidence score. The subscription associates an application with the corresponding interest, actions, and other features related to a user-interest record. Upon request by the universal memory manager 268 or by some other component, the application interest manager 267 retrieves the interests that an application has subscribed to. In addition to interests, the relevant actions and other characteristics that may modify the interest are also returned and provided to the requesting component.

The universal memory manager 268 can add and retrieve user-interest records from data storage 225. Each time a user-interest record is generated, by interest determiner 264, event monitor 280, or some other component, it can be stored in data store 225 for later retrieval. Each interest record, such as interest record 240, is associated with one or more interests 242. A single record may include multiple interests within a single domain. For example, an interest in jazz music could be combined with an interest in one or more specific jazz genres. The interest record 240 can include an application ID 245 that indicates an application from which data forming the record 240 originated. For example, the application ID may specify a music player application from which listening data was analyzed to generate an interest record 240.

The interest record 240 can also include one or more actions associated with the interest record. The interest record 240 includes action one 247 and action two 249. Using the music example, a listening event could cause the listing action to be associated with an interest record. Purchasing music could cause a second action to be associated with the interest record. The user ID 244 is used to associate the interest record 240 with the user. The first entity record 246 and the second entity record 248 hold entities associated with the interest. In the music example, the first entity record 246 could be an artist the user listened to and the second entity record 248 could be a song.

The entity resolver 266 converts a general entity identification into an application-specific identification. For example, different applications may use different identifications for the same entity. A knowledge base can be used to track the entity IDs of different entities and substitute correct entity IDs for a particular application when passing the interest record to the application.

Continuing with FIG. 2, example system 200 includes one or more applications 270, which comprise applications or services that consume user-interest records to provide user experiences. The user record data can be communicated to applications 270 through an API. Examples of applications 270 may include, without limitation, fitness monitoring and training applications, navigation applications, search applications, personal assistant applications, shopping applications, social media applications, games, and reservation applications.

Figure 3:
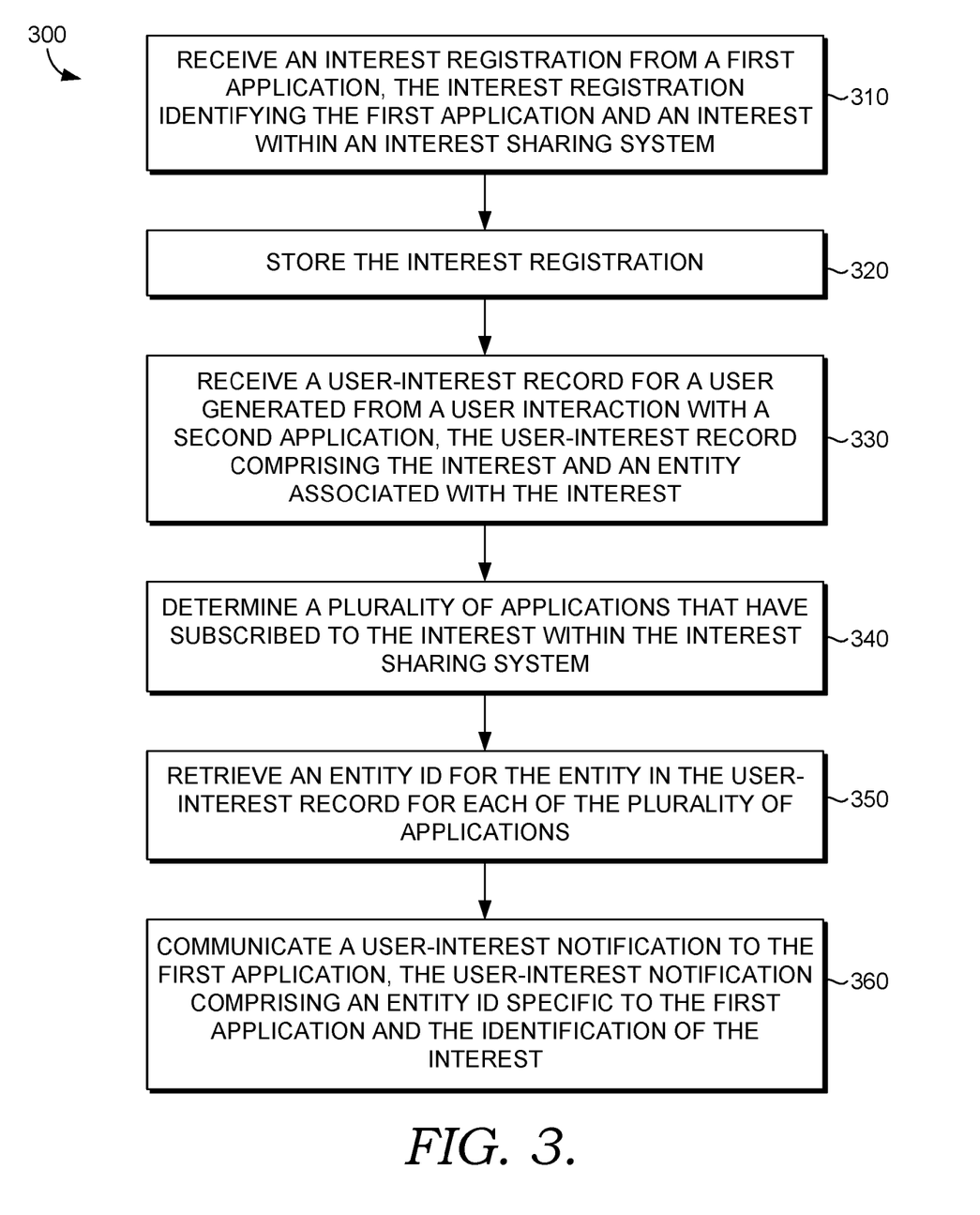
FIGS. 3-5 are flow diagrams showing additional exemplary methods of sharing user-interest information between applications, in accordance with an aspect of the technology described herein.

Turning now to FIG. 3, a method 300 of sharing user-interest information between applications is provided. The applications can be installed on one or more computing devices associated with a user. The sharing can be facilitated by a service that receives user-interest information from multiple applications.

At step 310, an interest registration is received from a first application. The interest registration identifies the first application and an interest within an interest sharing system. For example, the registration may include the application ID and an interest ID. The request could also specify an action associated with the interest. For example, the application may only want interest data associated with a purchase action or a search action.

At step 320, the interest registration is stored. The interest registration can be stored in a knowledge graph where each application is a node and each interest is a node. The actions can also be nodes. The registration is stored by making a link between nodes within the graph.

At step 330, a user-interest record for a user is received. The record is generated from a user interaction with a second application. The user-interest record comprises the interest and an entity associated with the interest. For example, submission of a search query can generate a user-interest record. The classifier used to process the query can assign a query intent. For example, the query "closest flower shop" could be assigned a shopping intent with flower as the entity.

At step 340, a plurality of applications that have subscribed to the interest within the interest sharing system is determined.

At step 350, an entity ID for the entity is retrieved in the user-interest record for each of the plurality of applications.

At step 360, a user-interest notification is communicated to the first application. The user-interest notification comprises an entity ID specific to the first application and the identification of the interest.

Figure 4:
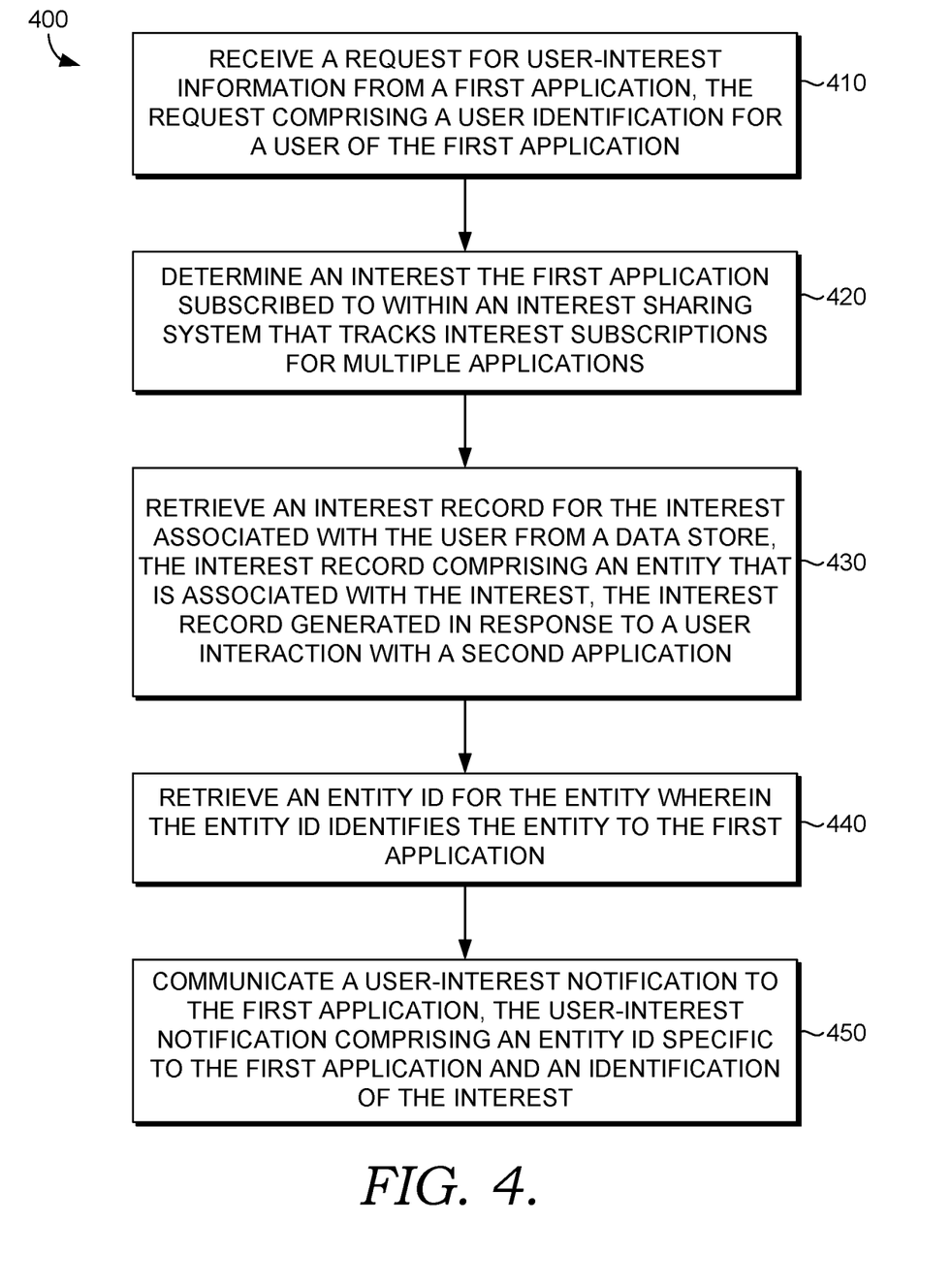

Turning now to FIG. 4, a method 400 of sharing user-interest information between applications is provided. The applications can be installed on one or more computing devices associated with a user. The sharing can be facilitated by a service that receives user-interest information from multiple applications.

At step 410, a request for user-interest information is received from a first application. The request comprises a user identification for a user of the first application.

At step 420, an interest the first application subscribed to within an interest sharing system is determined. The interest sharing system tracks interest subscriptions for multiple applications. Additionally, an action or other characteristic of the user-interest record may be retrieved.

At step 430, an interest record for the interest that is associated with the user from a data store is retrieved. The interest record comprises an entity that is associated with the interest. The interest record is generated in response to a user interaction with a second application. The retrieved interest record satisfies the subscription criteria provided by the application originally.

At step 440, an entity ID for the entity is retrieved. The entity ID identifies the entity to the first application. The entity ID may be determined by matching the entity in a knowledge base to the entity ID used by the application.

At step 450, a user-interest notification is communicated to the first application. The user-interest notification comprises an entity ID specific to the first application and an identification of the interest. Other characteristics of the interest record can be included in the user-interest notification.

Figure 5:
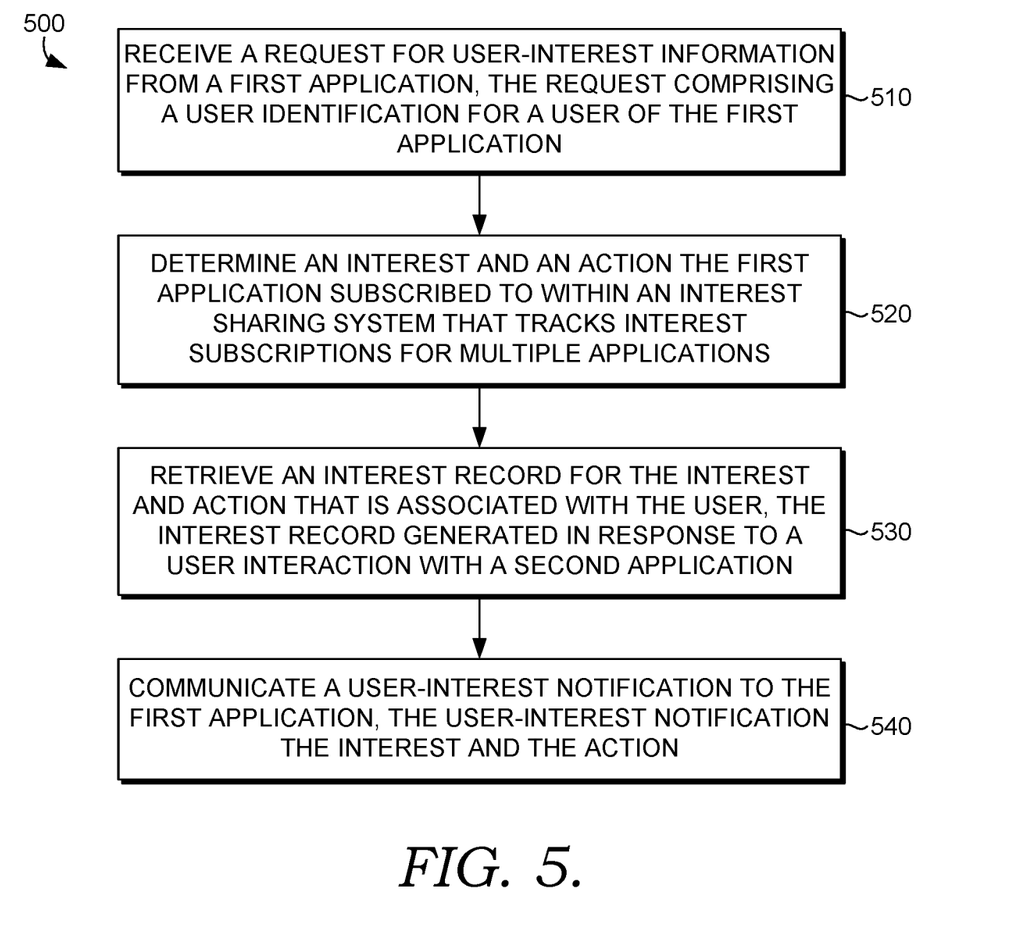

Turning now to FIG. 5, a method 500 of sharing user-interest information between applications is provided. The applications can be installed on one or more computing devices associated with a user. The sharing can be facilitated by a service that receives user-interest information from multiple applications.

At step 510, a request for user-interest information from a first application is received. The request comprises a user identification for a user of the first application.

At step 520, an interest and an action the first application subscribed to within an interest sharing system is determined. The interest sharing system tracks interest subscriptions for multiple applications.

At step 530, an interest record for the interest and action that is associated with the user is received. The interest record is generated in response to a user interaction with a second application.

At step 540, a user-interest notification is communicated to the first application. The user-interest notification specifies the interest and the action.

Exemplary Operating Environment

Figure 6:
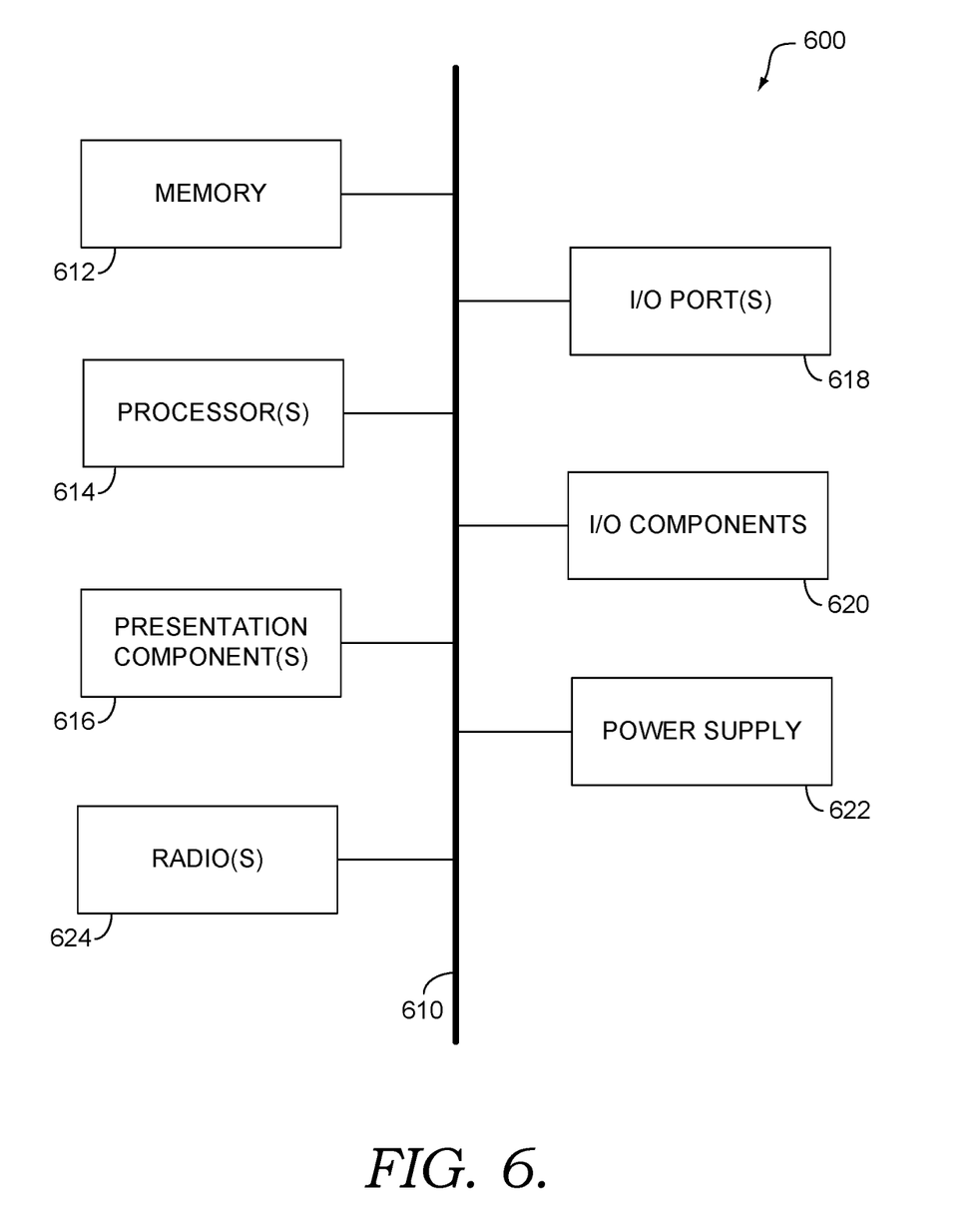
FIG. 6 is a block diagram of an exemplary computing environment suitable for use in implementing aspects of the technology described herein.

Referring to the drawings in general, and initially to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to perform a method of sharing user-interest information between applications, the method comprising:

receiving, at an interest sharing system, an interest registration from a first application, the interest registration identifying the first application and an interest within the interest sharing system;

storing the interest registration, at an interest sharing system;

receiving, at the interest sharing system, a user-interest record for a user generated from a user interaction with a second application, the user-interest record comprising the interest and an entity associated with the interest;

determining, at the interest sharing system, a plurality of applications that have subscribed to the interest within the interest sharing system, including the first application;

retrieving an entity ID for the entity in the user-interest record for each of the plurality of applications; and communicating, from the interest sharing system, a user-interest notification to the first application, the user-interest notification comprising an entity ID specific to the first application and the identification of the interest.

2. The media of claim 1, wherein the interest registration further comprises an action ID for an action associated with the interest.

3. The media of claim 1, wherein the interest registration is stored in an interest/action graph that is a knowledge graph by linking an interest ID node with an application ID node in the interest/action graph.

4. The media of claim 1, wherein the user-interest record comprises an action associated with the interest and the method further comprises determining the plurality of applications that have subscribed to the interest within the interest sharing system and the action.

5. The media of claim 4, wherein the interest registration also identifies the action within an interest sharing system.

6. The media of claim 1, wherein retrieving the entity ID for the entity comprises looking up an entity node for the entity in a knowledge graph and finding the entity ID for the first application by following an edge from the entity node to a node associated with the first application.

7. The media of claim 1, wherein the method further comprises receiving a request for user-interest information from the first application, the request comprising an application ID and a user ID for the user of the first application.

8. A method of sharing user-interest information between applications, the method comprising:

receiving a request for user-interest information from a first application, the request comprising a user identification for a user of the first application;

determining an interest the first application subscribed to within an interest sharing system that tracks interest subscriptions for multiple applications;

retrieving an interest record for the interest that is associated with the user from a data store, the interest record comprising an entity that is associated with the interest, the interest record generated in response to a user interaction with a second application;

retrieving an entity ID for the entity, wherein the entity ID identifies the entity to the first application; and communicating a user-interest notification to the first application, the user-interest notification comprising an entity ID specific to the first application and an identification of the interest.

9. The method of claim 8, further comprising:

receiving an interest registration from the first application, the interest registration identifying the first application and the interest within the interest sharing system; and storing the interest registration.

10. The method of claim 8, further comprising receiving the user-interest record for a user generated from a user interaction with the second application, the user-interest record comprising the interest and an entity associated with the interest and storing the user-interest record.

11. The method of claim 8, wherein the interest registration is stored in an interest/action graph that is a knowledge graph by linking an interest ID node with an application ID node in the interest/action graph.

12. The method of claim 8, the request comprising an application ID and a user ID for the user of the first application.

13. The method of claim 8, wherein retrieving the entity ID for the entity comprises looking up an entity node for the entity in a knowledge graph and finding the entity ID for the first application by following an edge from the entity node to a node associated with the first application.

14. The method of claim 8, wherein the user-interest record comprises an action associated with the interest and the method further comprises determining that the first application subscribed to the action within an interest sharing system.

15. The method of claim 14, wherein the user-interest notification identifies the action.

16. A method of sharing user-interest information between applications comprising:

receiving a request for user-interest information from a first application, the request comprising a user identification for a user of the first application;

determining an interest and an action the first application subscribed to within an interest sharing system that tracks interest subscriptions for multiple applications;

retrieving an interest record for the interest and action that is associated with the user, the interest record generated in response to a user interaction with a second application;

communicating a user-interest notification to the first application, the user-interest notification specifies the interest and the action.

17. The method of claim 16, further comprising:

receiving an interest registration from the first application, the interest registration identifying the first application, the action, and the interest within the interest sharing system; and storing the interest registration.

18. The method of claim 16, wherein the interest record comprises an entity that is associated with the interest and the method further comprises retrieving an entity ID for the entity, wherein the entity ID identifies the entity to the first application.

19. The method of claim 18, wherein retrieving the entity ID for the entity comprises looking up an entity node for the entity in a knowledge graph and finding the entity ID for the first application by following an edge from the entity node to a node associated with the first application.

20. The method of claim 16, wherein the user interaction is a query.

* * * * *